April 21, 1953   C. W. BRYANT   2,635,905
VALVE STEM LOCKING DEVICE
Filed March 16, 1950
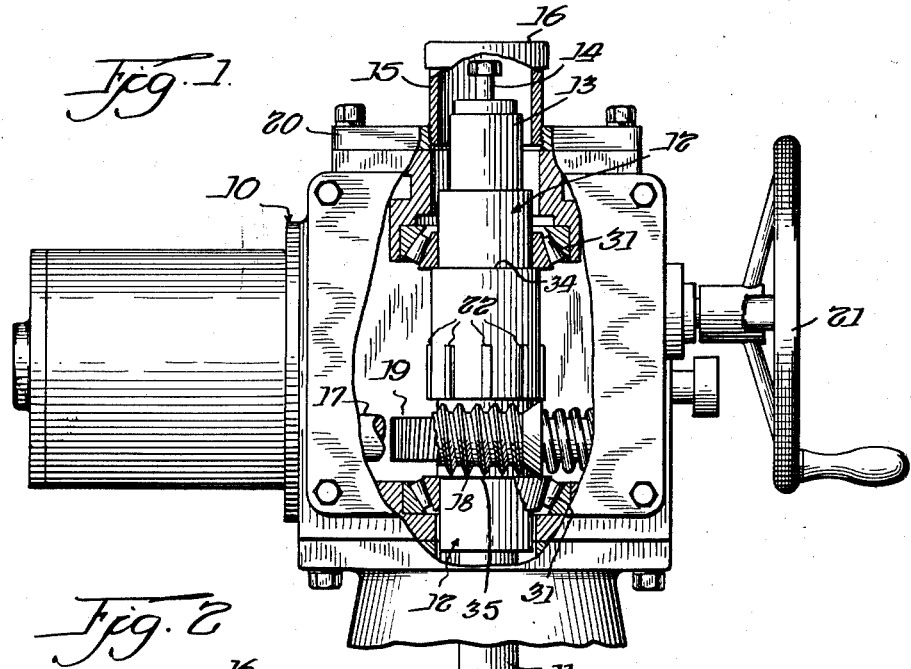
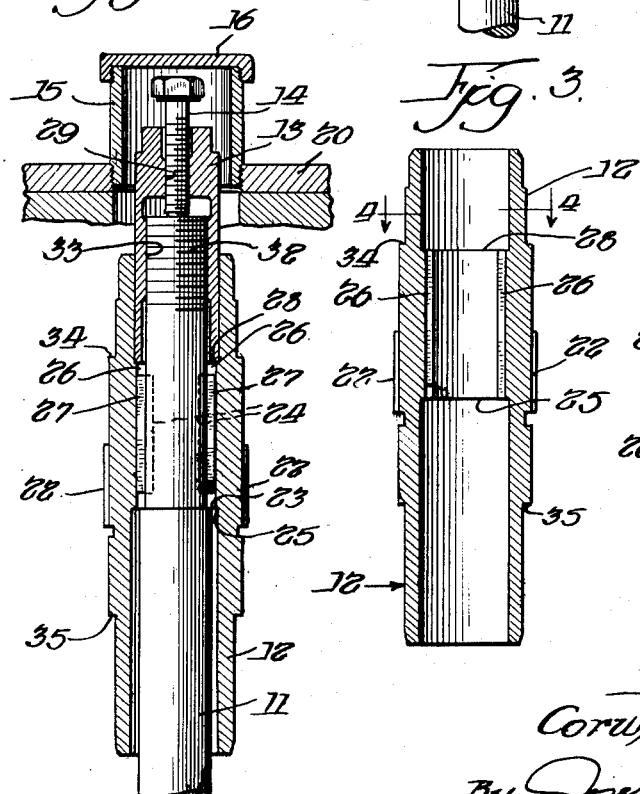
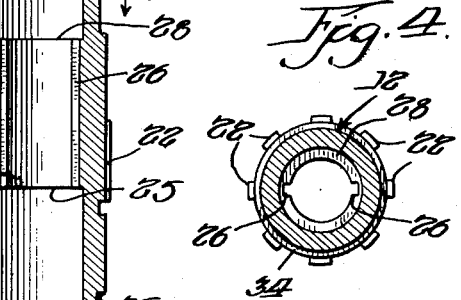
Inventor.
Corwin W. Bryant.
By Joseph O. Lange
Atty.

Patented Apr. 21, 1953

2,635,905

UNITED STATES PATENT OFFICE 2,635,905

VALVE STEM LOCKING DEVICE

Corwin W. Bryant, Downers Grove, Ill., assignor to Crane Co., Chicago, Ill., a corporation Application March 16, 1950, Serial No. 150,045

4 Claims. (Cl. 287—53)

This invention pertains to a non-rising valve stem locking device for use on motor operated valves. Such a motor operated valve may be of the type employing a conventional motor unit, in which the latter is mounted on the upper end of the usual extending valve stem.

Heretofore, in explanation of the background of this invention, it has been a problem with the above mentioned type unit to handle conveniently and economically the assembly and disassembly of these units with a non-rising valve stem. It should be understood that the unit sleeve normally retained within a motor unit has heretofore been inaccessible for attachment or for renewing parts. Therefore, in the combination of a non-rising stem and motor unit operated valve, it has been discovered that means can be provided which will afford simple accessibility from outside the motor unit itself.

An important object of this invention is also to provide a structure for the locking of a motor unit sleeve on a non-rising valve stem.

Similarly, another object is to provide a motor unit sleeve locking device structure which is accessible from outside the said motor unit, thereby simplifying the attachment or dismantling of the motor unit itself to and from the valve stem, which heretofore has necessitated expensive shut-downs and service charges.

Still another object is to provide a structure which has relatively few parts, which parts are simple and therefore are less expensive to manufacture and install, and yet this device maintains desirable durability and service.

Other objects and advantages will become more readily apparent upon reading the following description in conjunction with the attached drawings, in which:

Fig. 1 is a fragmentary sectional view showing a motor unit having the locking device assembly embodying my invention.

Fig. 2 is a fragmentary sectional view showing the locking device assembly separated from the motor unit of Fig. 1.

Fig. 3 is a sectional view of the unit sleeve.

Fig. 4 is a transverse sectional view taken on line 4—4 of Fig. 3.

Similar reference numerals refer to similar parts throughout the several views.

As shown in Fig. 1, a motor unit 10 is shown mounted over a non-rising valve stem 11 (the upper portion only being shown) supporting a member which is termed by those skilled in the art a unit sleeve 12 and a locking means therefor consisting of a stem block 13 and a cap screw 14 (Fig. 2). It will be noted that the stem block 13 is connected to the unit sleeve 12 and encloses the said valve stem upper end, extending above the top limit of the motor unit 10. The stem block cap screw 14 is threadedly engaged through the top of the stem block 13 and is covered by a stem enclosure 15 of tubular form and an enclosure cap 16 which is preferably threaded into a top cover plate 20 of the motor unit 10.

For purposes of clarity in understanding, in Fig. 1, the means of gearing the unit sleeve 12 with a motor shaft 17 is shown in a simple form. A horizontally extending worm 18 on the motor drive shaft 17 meshes with a worm wheel 19 mounted in non-rotatable relation to the rotatable unit sleeve 12. A handwheel 21 is mounted on the motor unit 10 for use in manual operation, but the conventional gearing arrangement thereof with the unit sleeve 12 is not shown, because it is well known and is not deemed to be significant relative to this invention. However, a plurality of longitudinally disposed splines 22 integral with the unit sleeve 12 are shown for receiving a conventional driven gear to effect its rotation. The usual thrust bearings 31 are shown to provide suitable longitudinal support at the unit sleeve shoulders 34 and 35 on each end portion of the said sleeve 12.

As a means for accomplishing the aforementioned objects, as shown in Fig. 2, a non-rising valve stem 11 is provided with a shoulder 23 near the upper end thereof, and two diametrically oppositely disposed keyways are contained on a portion of the valve stem 11 above the stem shoulder 23. The cylindrical unit sleeve 12 is positioned on the end of the valve stem 11 and is supported by an internal unit sleeve shoulder 25 abutting the valve stem shoulder 23. Two diametrically oppositely disposed keyways 26 are arranged within a portion of the inner periphery of the unit sleeve 12 to register with the stem keyways 24, as shown more clearly in Figs. 3 and 4. The splines 22 around an outer peripheral portion of the unit sleeve 12 are integral with the latter member for the purpose of transmitting rotation from the handwheel shaft (not shown) to the valve stem 11 through two keys 27 carried in the keyways 24 and 26.

An external upper end portion 32 of the valve stem 11 is threaded to receive an internally threaded portion 33 of the cap-shaped stem block 13. At this stage of assembly, the adjacent ends of the stem block 13 and the unit sleeve 12 are telescoped for a portion thereof to provide for the stem block 13 to enter the unit sleeve 12 to a shoulder 28 above the unit sleeve keyways 26. It will be understood that this arrangement will permit telescoping the said unit sleeve 12 within, as shown, or it could be provided that the bottom of the stem block 13 will abut the top of the said unit sleeve 12. A tapped hole 29 through the top of the stem block 13 receives the stem block cap screw 14 which extends to the upper end surface of the valve stem 11, thereby holding the stem block 13 in locked relation to the valve stem 11. Thus, through the force exerted by the cap screw 14 on the stem block 13, the latter member is drawn upwardly on the stem 11, thereby locking these members by frictional forces on their respective threads.

Thus, it will be apparent that while the unit sleeve 12 is axially secured in position by the stem block 13 and the valve stem shoulder 23, nevertheless the motor unit 10 may be readily removed by disassembling operations performed outside of the motor unit 10 proper.

Although this invention has been shown in one preferred form, it should not be so limited, but rather it shall be susceptible to modifications established by the spirit of the application as defined by the appended claims.

I claim:

1. In a means for fastening a unit sleeve to a rotatable shaft, a shaft having diametrically oppositely disposed keyways and having a threaded end portion, the said means including a unit sleeve mounted over an end portion of the said rotatable shaft and having keyways to register with the said shaft, shoulder means on the said shaft and sleeve for limiting the inward movement of the said unit sleeve, a hollow internally threaded stem block in threaded engagement with said threaded end portion of the shaft to secure the said unit sleeve onto the said shaft, the said block having a threaded hole through one end, screw means to engage the said stem block threaded hole and extend therethrough to the said shaft thereby locking the said unit sleeve to the said shaft.

2. The combination in a means for fastening a unit sleeve to a threaded rotatable shaft, a shaft having a shoulder portion and diametrically oppositely disposed keyways, the said means including a unit sleeve mounted over a portion of said shaft and having keyways to register with the said keyways, a removable tubular member threadedly mounted over the end of the said threaded shaft and abutting the said unit sleeve to secure the same onto the said shaft, the said tubular member having a threaded aperture through one end thereof, threaded means engaging the threaded aperture of said tubular member and projecting therethrough to abut against an end surface of the said shaft thereby to lock the said sleeve to the shaft.

3. In a fastening means for connecting a unit sleeve to a rotatable shaft, a shaft having diametrically oppositely disposed keyways and having a threaded end portion, the said means including a unit sleeve mounted over an end portion of the said shaft and having keyways to register with the said shaft keyways, shoulder means on the said shaft and sleeve for limiting the inward motion of the said unit sleeve, a hollow threaded stem block to engage with the threaded end portion of the said shaft and hold the said unit sleeve onto the said shaft, the said block having a threaded aperture through one end, threaded means engaging the said stem block threaded aperture and extending therethrough to the said shaft thereby locking the said unit sleeve to the said shaft, the said stem block being frictionally locked by the axial forces placed on the respective screw threads of the said stem block and threaded means when the said threaded means is predeterminately rotated against an end surface of the shaft.

4. In a fastening means for connecting a unit sleeve to a rotatable shaft, a threaded shaft having shoulder portions and having diametrically oppositely disposed keyways, the fastening means including a unit sleeve surmounting an end portion of said shaft and having keyways and a shoulder to cooperate with the keyways and shoulder of the shaft, a removable member mounted over the end of the said shaft and abutting the said unit sleeve to secure the latter element to the shaft and having a threaded aperture through one end thereof, a screw mounted within the threaded aperture of the removable member and arranged to abut against an end of the said shaft and thereby frictionally holding the said sleeve non-rotatably relative to the said shaft.

CORWIN W. BRYANT.

References Cited in the file of this patent

UNITED STATES PATENTS

| Number | Name | Date |
| --- | --- | --- |
| 2,269,802 | Wilson | Jan. 13, 1942 |
| 2,324,571 | Fitz | July 20, 1943 |
| 2,401,178 | Oehler et al. | May 28, 1946 |
| 2,475,042 | McCloskey | July 5, 1949 |